(12) United States Patent
Vanderzaden

(10) Patent No.: US 10,811,993 B2
(45) Date of Patent: Oct. 20, 2020

(54) POWER CONVERSION SYSTEM AND METHOD

(71) Applicant: ESS TECH, INC., Portland, OR (US)

(72) Inventor: Aaron Vanderzaden, Forest Grove, OR (US)

(73) Assignee: ESS TECH, INC., Portland, OR (US)

( * ) Notice: Subject to any disclaimer, the term of this patent is extended or adjusted under 35 U.S.C. 154(b) by 73 days.

(21) Appl. No.: 15/844,250

(22) Filed: Dec. 15, 2017

(65) Prior Publication Data

US 2019/0190400 A1    Jun. 20, 2019

(51) Int. Cl.
| | |
|---|---|
| *H02M 7/48* | (2007.01) |
| *H02J 7/35* | (2006.01) |
| *H02J 3/38* | (2006.01) |
| *H02J 3/32* | (2006.01) |
| *H02M 7/44* | (2006.01) |
| *H02S 40/32* | (2014.01) |
| *H02M 3/158* | (2006.01) |
| *H02M 3/335* | (2006.01) |

(52) U.S. Cl.
CPC ............. *H02M 7/4807* (2013.01); *H02J 3/32* (2013.01); *H02J 3/383* (2013.01); *H02J 7/35* (2013.01); *H02M 3/1584* (2013.01); *H02M 7/445* (2013.01); *H02S 40/32* (2014.12); *H02M 3/33584* (2013.01)

(58) Field of Classification Search
CPC ........ H02M 7/006; H02M 7/445; H02M 7/48; H02M 7/4807; H02M 7/51; H02M 3/158; H02M 3/1584; H02M 3/33507; H02S 40/32; H02J 3/382

USPC ................... 363/95, 120, 122, 8; 307/64, 66
See application file for complete search history.

(56) References Cited

U.S. PATENT DOCUMENTS

| | | | |
|---|---|---|---|
| 2005/0006958 A1* | 1/2005 | Dubovsky | H02J 3/382 307/64 |
| 2013/0027993 A1* | 1/2013 | Tan | H02M 7/515 363/40 |
| 2013/0027997 A1* | 1/2013 | Tan | G05F 1/67 363/95 |
| 2014/0084694 A1 | 3/2014 | Barauna | |

(Continued)

FOREIGN PATENT DOCUMENTS

| | | |
|---|---|---|
| KR | 20150102765 A | 9/2015 |
| KR | 20160029235 A | 3/2016 |
| KR | 101794837 B1 | 11/2017 |

OTHER PUBLICATIONS

ISA Korean Intellectual Property Office, International Search Report and Written Opinion Issued in Application No. PCT/US2018/059831, dated Feb. 25, 2019, WIPO, 11 pages.

(Continued)

*Primary Examiner* — Yemane Mehari
(74) *Attorney, Agent, or Firm* — McCoy Russell LLP

(57) ABSTRACT

Systems and methods for operating a power conversion system that includes a sole DC/DC converter are described. The systems and methods reduce a total number of DC/DC converters in a power system that includes an electric energy storage device and a photovoltaic array. The system and method provide for transferring electrical charge from the photovoltaic array and the electric energy storage device to an alternating current stationary electrical grid via a DC bus and an inverter.

20 Claims, 7 Drawing Sheets

(56) References Cited

U.S. PATENT DOCUMENTS

| | | | | |
|---|---|---|---|---|
| 2014/0173300 A1* | 6/2014 | Yamazaki | ............... | H02J 7/007 |
| | | | | 713/300 |
| 2014/0184162 A1* | 7/2014 | Takahashi | ............... | H02J 7/007 |
| | | | | 320/128 |
| 2015/0326108 A1 | 11/2015 | Augustoni | | |
| 2017/0054295 A1* | 2/2017 | Hansen | ................... | H02J 3/382 |
| 2019/0341642 A1* | 11/2019 | Tomita | .................... | H01M 8/04 |

OTHER PUBLICATIONS

Lee, S. et al., "A Three-Phase Current-Fed Push-Pull DC-DC Converter with Active Clamp for Fuel Cell Applications," IEEE Transactions on Power Electronics, vol. 26, No. 8, Dec. 3, 2010, 8 pages.

Lu, X. et al., "An Improved Droop Control Method for DC Microgrids Based on Low Bandwith Communication with DC Bus Voltage Restoration and Enhanced Current Sharing Accuracy," IEEE Transactions on Power Electronics, vol. 29, No. 4, Jun. 13, 2013, 12 pages.

Nene, H., "TI Designs: TIDA-BIDIR-400-12 Bidirectional DC-DC Converter," Texas Instruments Website, Available Online at http://www.ti.com/lit/ug/tiduai7/tiduai7.pdf, Sep. 2015, 79 pages.

* cited by examiner

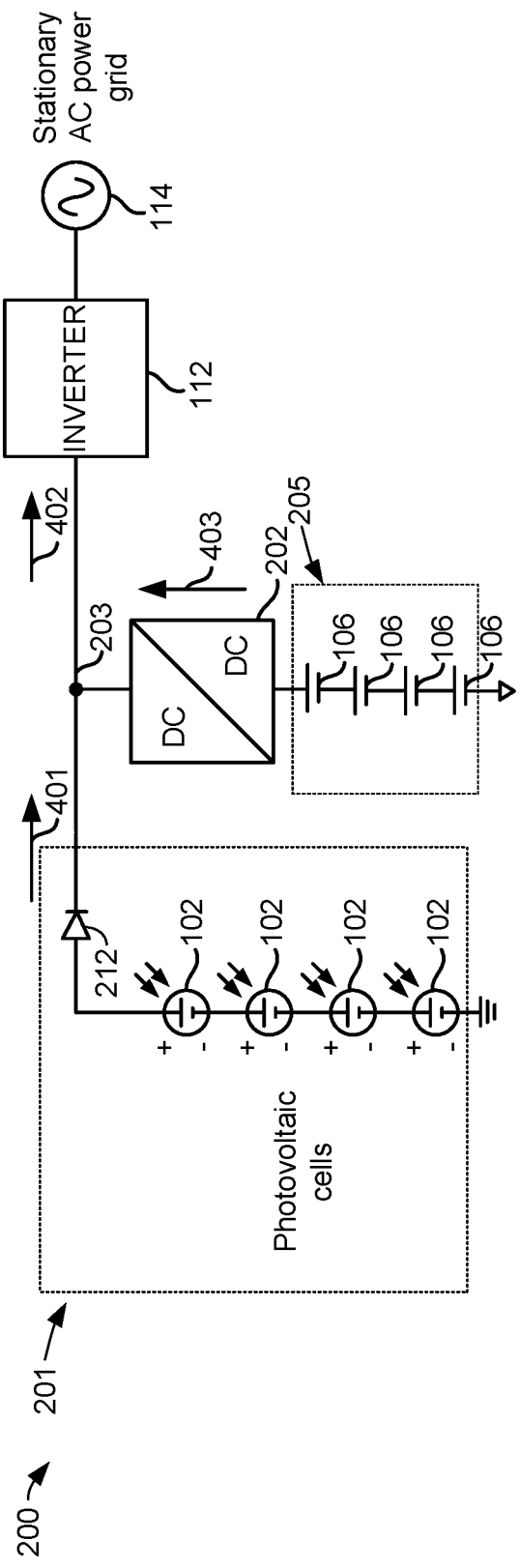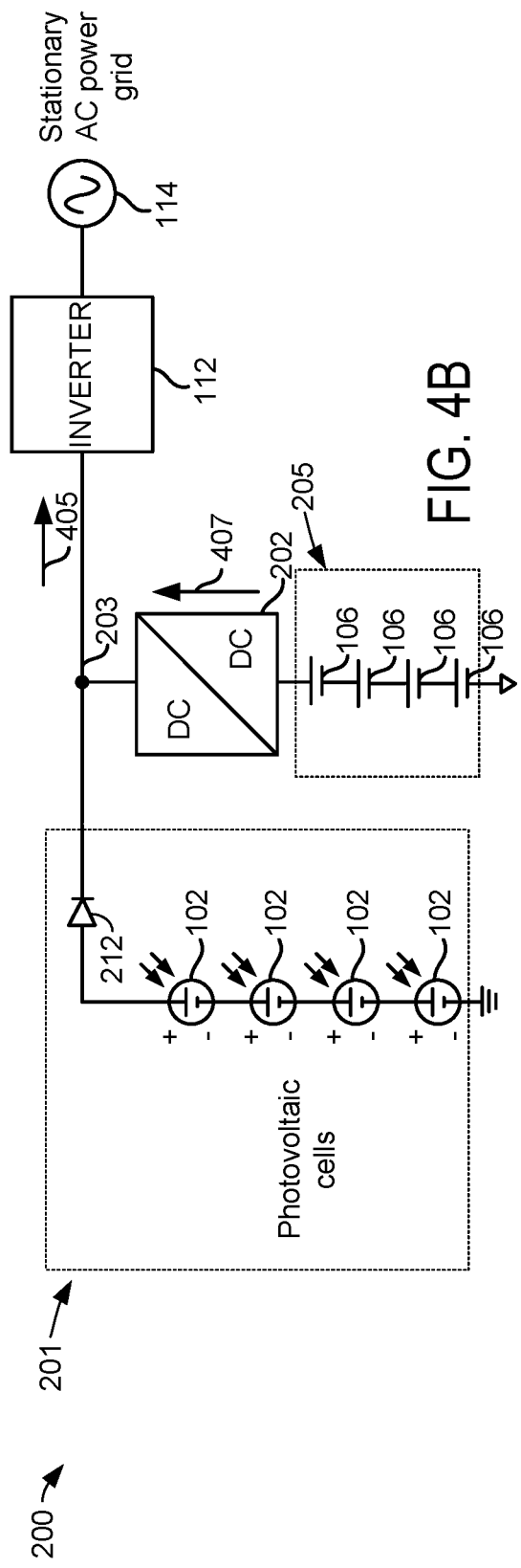

POWER CONVERSION SYSTEM AND METHOD

FIELD

The present description relates to a system and method for electric power conversion and distribution. The methods and systems may be particularly useful for electrical power systems that include a photovoltaic array and an electric energy storage device.

BACKGROUND AND SUMMARY

An array of photovoltaic cells may convert solar energy into electrical energy. The electrical energy supplied by the array of photovoltaic cells may be in the form of direct current (DC) supplied at a voltage that is dependent on the number of photovoltaic cells that are arranged in series. The DC power provided by the photovoltaic cells may be converted into alternating current (AC) via an inverter. However, because output of the photovoltaic cells may vary due to environmental conditions and conditions of the photovoltaic cells, battery cells may be included in an electrical system that includes photovoltaic cells. The battery cells may store charge from the photovoltaic cells when the AC demand is low and when power output capacity of the photovoltaic cells may be high. Further, the battery cells may supply electrical power to the AC electrical load when output capacity of the photovoltaic cells is low and AC electrical load is high. The battery cells may receive electric power from the photovoltaic cells after power from the photovoltaic cells is level shifted (e.g., adjusted from a higher voltage to a lower voltage) to near battery voltage by a first DC/DC converter and distributed via a DC bus. Electrical power from the DC bus may be level shifted (e.g., adjusted from a lower voltage to a higher voltage) to near AC grid line voltage by a second DC/DC converter and then supplied to the AC grid via an inverter. However, this power distribution scheme utilizes two DC/DC converters, which increases system cost and may reduce system efficiency. Therefore, it may be desirable to provide a way of distributing electrical power that may increase efficiency and reduce system cost.

The inventor herein has recognized the above-mentioned issues and has developed a power conversion system, comprising: a direct current (DC) bus; a DC power source directly electrically coupled to the DC bus; an inverter directly coupled to the DC bus; an electric energy storage device; and a sole DC/DC converter electrically coupled to the DC bus and the electric energy storage device.

By directly electrically coupling a DC power source to a DC bus and electrically coupling a sole DC/DC converter to the DC bus, it may be possible to reduce power conversion system cost and increase power conversion system efficiency. In particular, a DC power source may be directly electrically coupled to a DC bus and an inverter may be directly electrically coupled to the DC bus so that output from the DC source may be transferred to a stationary alternating current (AC) power grid without the power that is produced by the DC power source passing through two DC/DC converters. Consequently, power transfer may be made more efficient. Further, since no DC/DC converters are used to couple the DC power source to the inverter, system cost may be reduced.

The present description may provide several advantages. In particular, the approach may reduce power conversion system cost. Further, the approach may increase power conversion system efficiency. In addition, the approach may selectively charge and discharge electric energy storage devices to improve efficiency of a DC power source.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 4A-4D shows example operating modes for the electric power conversion system of FIG. 2;

DETAILED DESCRIPTION

Figure 2:
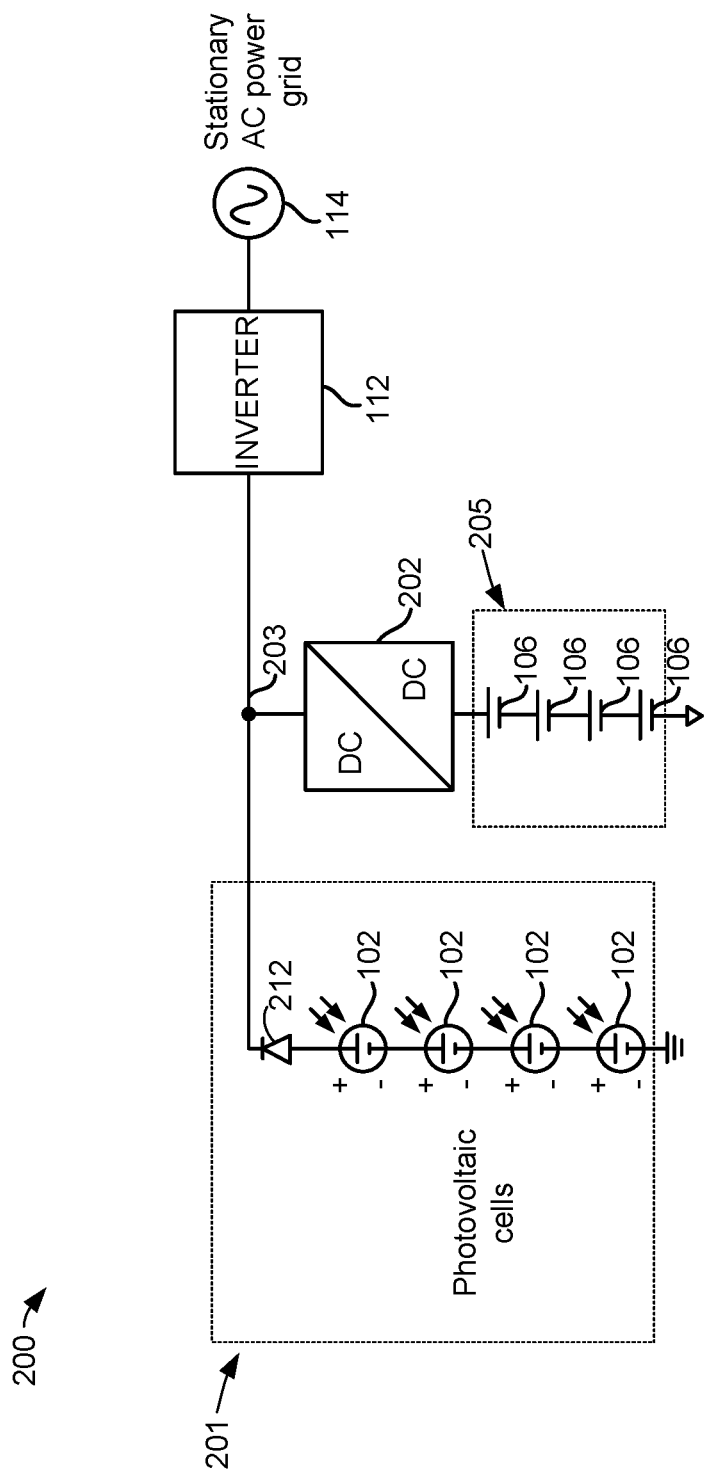
FIG. 2 is a schematic diagram of an electric power conversion system that utilizes a sole DC/DC converter.
Figure 3:
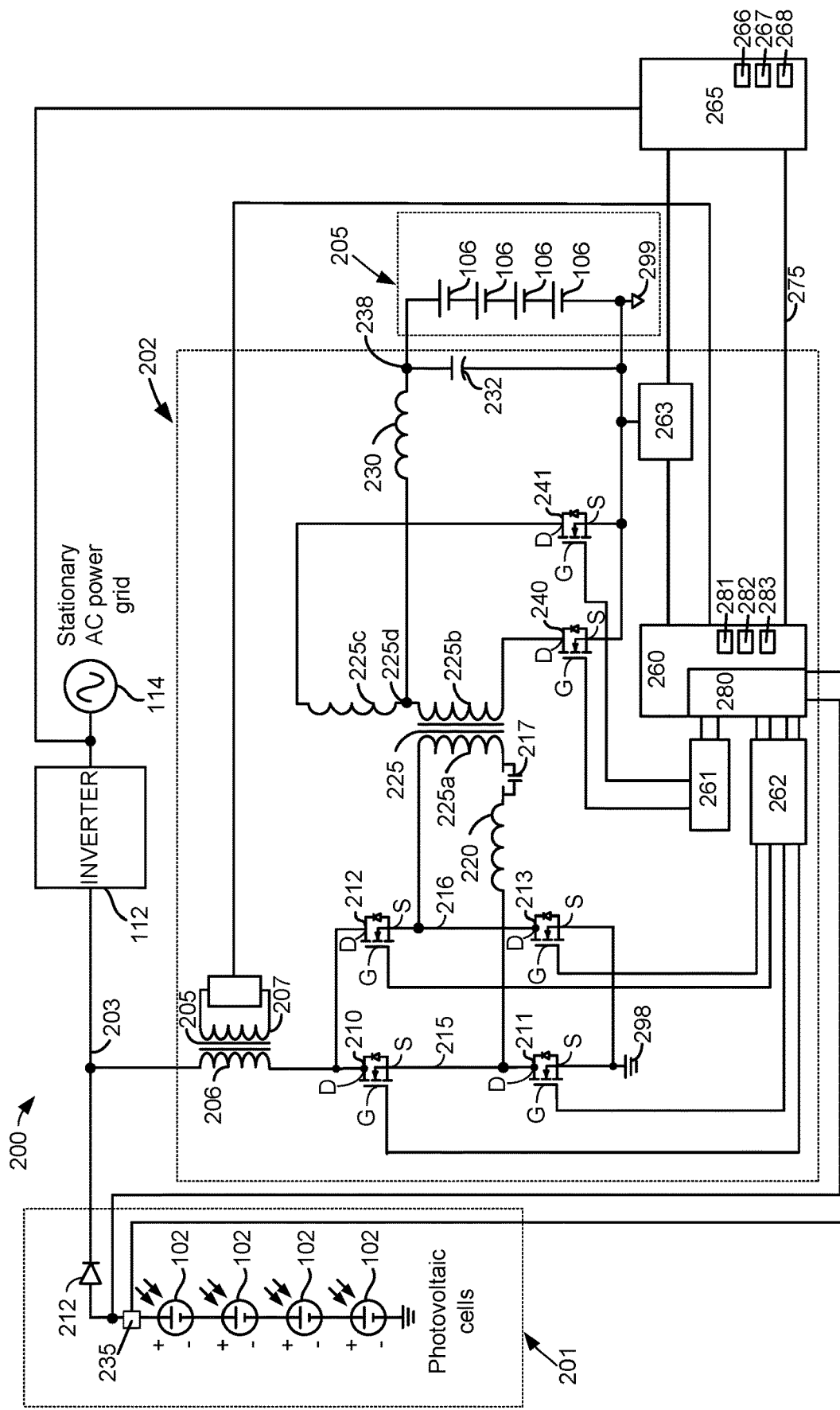
FIG. 3 shows a detailed schematic of the electric power conversion system of FIG. 2.
Figure 5:
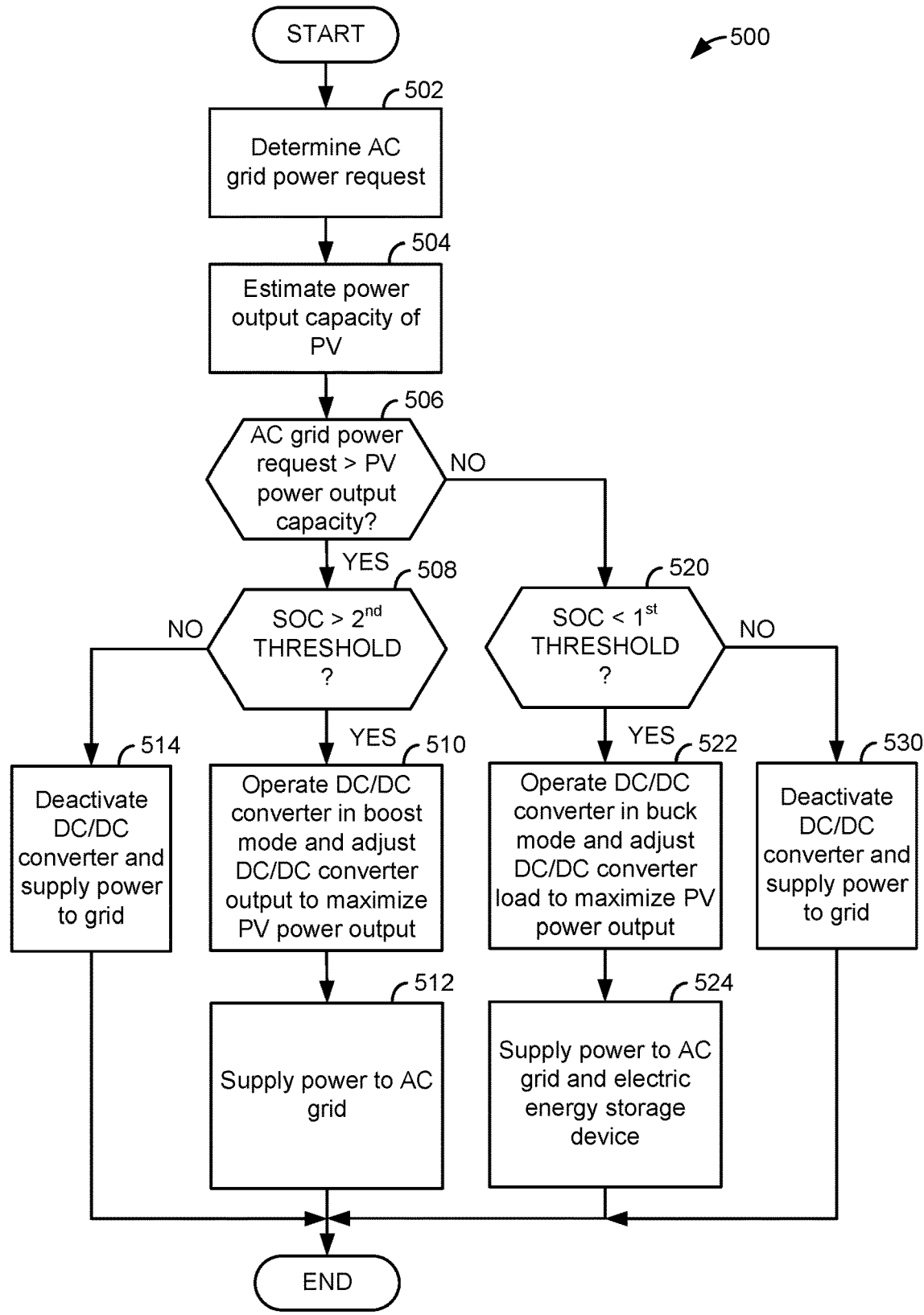
FIG. 5 shows a flow chart of a method for operating the electric power conversion system of FIG. 2.
Figure 6:
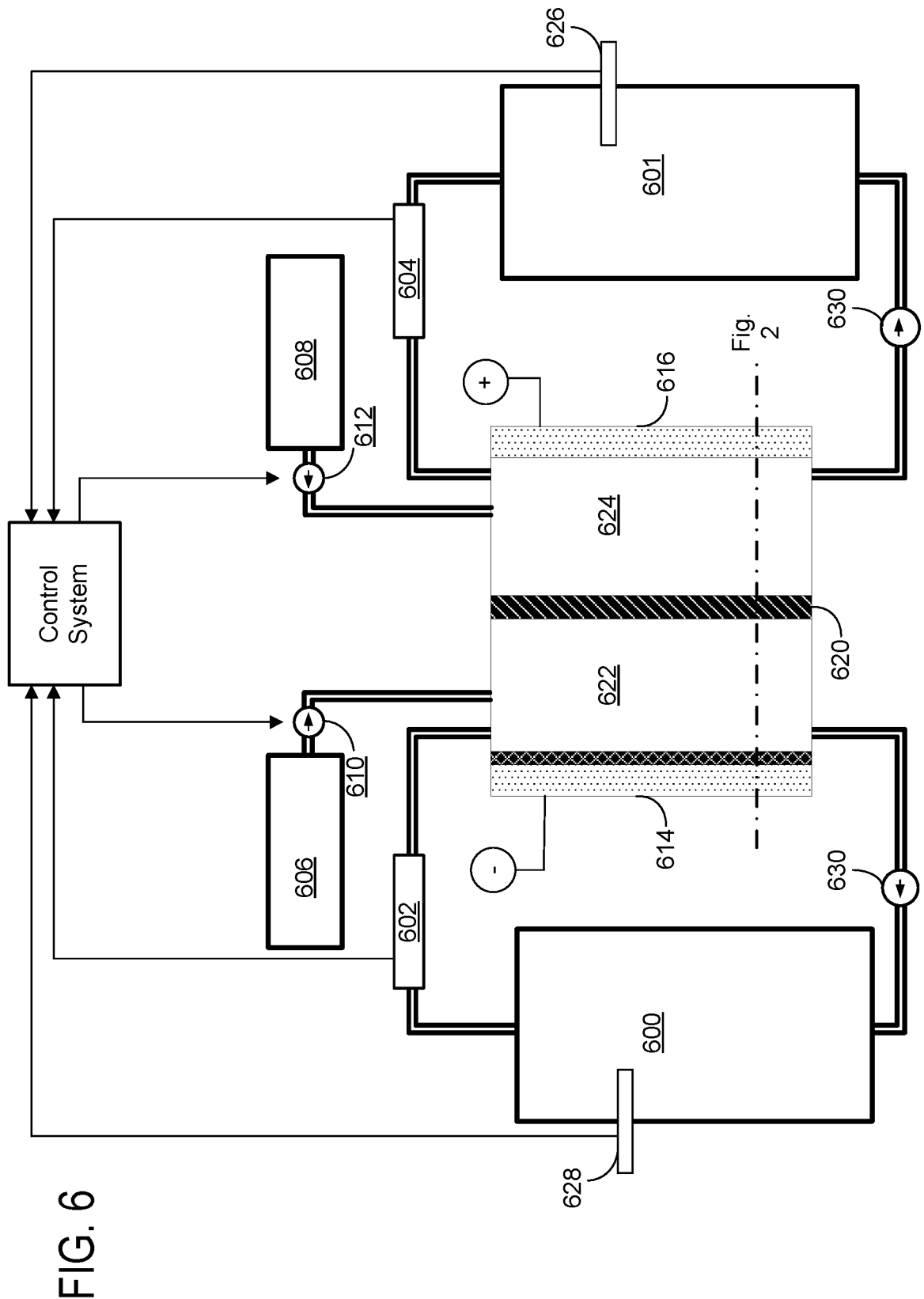
FIG. 6 shows a schematic diagram of an example electric energy storage device that may be included in the electric power conversion system of FIG. 2.

The present description is related to generating power via a DC power source and distributing power from the DC power source to a stationary AC electrical power grid and electric energy storage devices. A prior art electric power conversion system that utilizes two DC/DC converters to transfer power from a DC power source to a stationary AC electric power grid is shown. An electric power conversion system that distributes power from a DC power source to a stationary AC electric power grid and sole DC/DC converter that distributes power from the DC power source to an electric energy storage device or that distributes power from the electric energy storage device to the stationary AC electric power grid is shown in FIG. 2. A detailed schematic of the electric power conversion system of FIG. 2 is shown in FIG. 3. Various operating modes of the system of FIG. 2 are shown in FIGS. 4A-4D. A method for operating the system of FIG. 2 is shown in FIG. 5. The method provides for distributing electrical power between electric power sources and electric power consumers. Finally, an example electrical energy storage device that may receive electrical power from the electric power conversion system is shown in FIG. 6.

Figure 1:
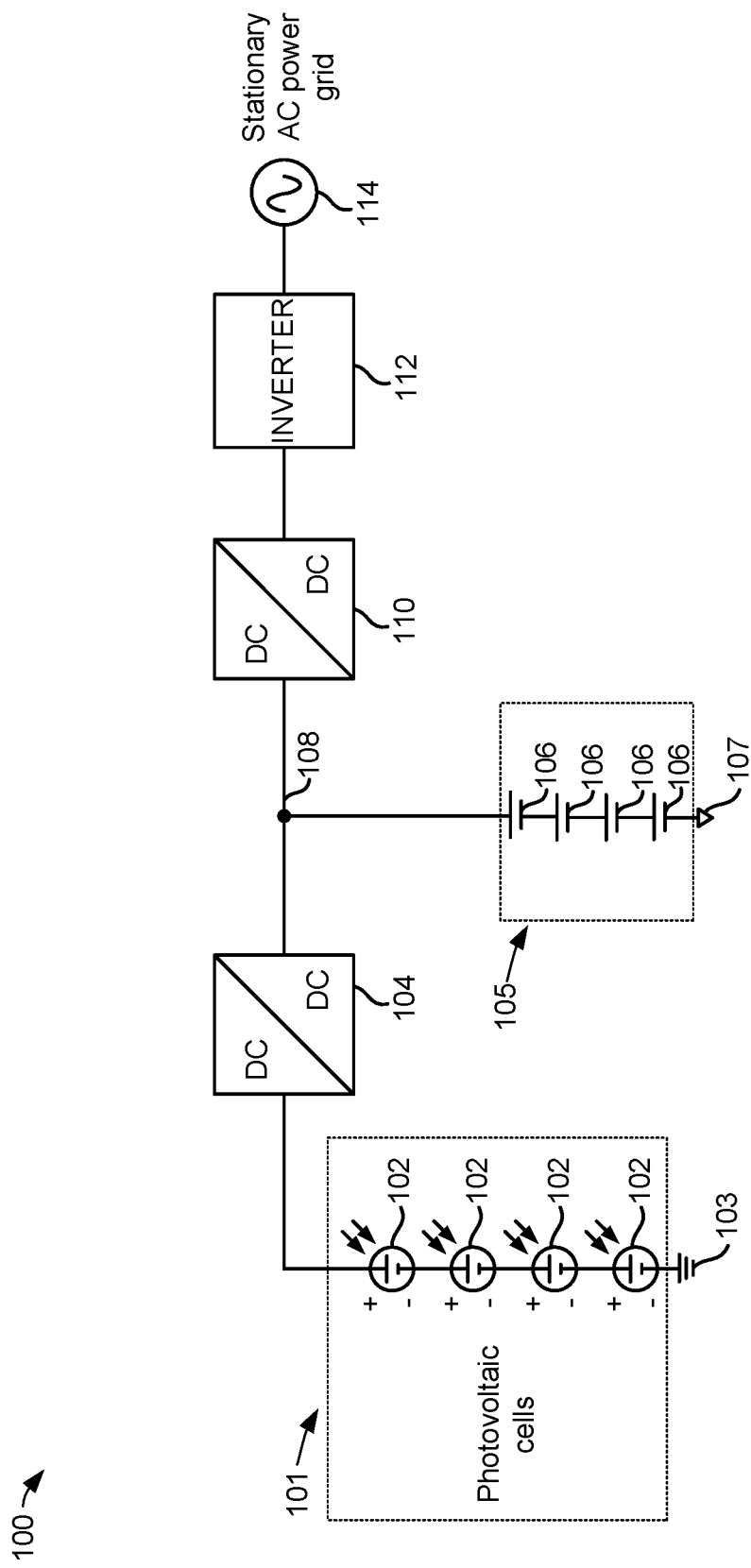
FIG. 1 is a schematic diagram of a prior art electric power conversion system.

Referring to FIG. 1, electric power conversion system 100 is a prior art power conversion system that utilizes two DC/DC converters to transfer electric power from DC power source 101 to stationary AC electrical power grid 114. In this example, DC power source 101 is a photovoltaic array comprised of a plurality of photovoltaic cells 102. Photovoltaic cells 102 may output electrical charge in response to solar energy received via the photovoltaic cells 102. Voltage output by photovoltaic array 101 may be increased via increasing an actual total number of photovoltaic cells 102 arranged in a series electrical connection scheme. Current output by photovoltaic array 101 may be increased via combining photovoltaic cells 102 in a parallel connection scheme. Electrical power output via photovoltaic array 101 may be reduced to a lower voltage suitable for charging electric energy storage device 105 (e.g., one or more batteries or capacitors) via first DC/DC converter 104. First DC/DC converter 104 may operate in a buck mode to lower voltage supplied from photovoltaic array 101 to a voltage suitable for charging electric energy storage device 105. For example, photovoltaic array output voltage may be reduced from a high voltage of (300-1000 VDC) to a low voltage of (20-100 VDC) via first DC/DC converter 104. DC bus 108 may carry electrical charge to electric energy storage device 105 and second DC/DC converter 110. First DC/DC converter 104 may electrically isolate photovoltaic array 101 from electric energy storage device 105. As such, photovoltaic array 101 is shown electrically coupled to first ground 103 and electric energy storage device is shown electrically coupled to second ground 107, first ground 103 is different than second ground 107.

In one example, electric energy storage device 105 may be comprised of a plurality of battery cells 106. In another example, electric energy storage device may be an all iron redox flow battery as is shown in FIG. 6. Battery cells 106 may be arranged in a series electrical connection scheme to increase voltage of electric energy storage device 105. Battery cells 106 may also be arranged in a parallel electrical connection scheme to increase current output from electric energy storage device 105. Charge from photovoltaic array 101 may charge electric energy storage device 105, or charge from electric energy storage device 105 may be supplied to stationary AC electrical power grid 114 via DC bus 108, second DC/DC converter 110, and inverter 112. Stationary AC electrical power grid may distribute electric power over a wide geographic area and it may include one or more stationary AC power sources.

Second DC/DC converter 110 may operate in a boost mode where voltage supplied to DC/DC converter 110 via DC bus 108 is increased. For example, electric energy transferred DC/DC converter 110 via DC bus 108 may be increased from low voltage (20-100 VDC) to high voltage (300-1000 VDC) via second DC/DC converter 110. Electric power output from second DC/DC converter 110 is converted to AC electric power via inverter 112. Inverter 112 transfers AC electric power to stationary AC electrical power grid 114.

Thus, the system of FIG. 1 applies first and second DC/DC converters to transfer electric power from DC power source 103 to AC stationary power grid 114. Further, voltage of power transferred may be changed two times before it may be utilized as AC power via stationary AC electric power grid 114.

Referring now to FIG. 2, a schematic block diagram of an electric power system that includes and applies a sole DC/DC converter is shown. Electric power conversion system 200 includes a DC power supply 201 that is directly electrically coupled to DC bus 203. DC bus 203 may be comprised of one or more electrical conductors (e.g., copper bus bars). DC power supply 201 may be a photovoltaic array comprised of a plurality of photovoltaic cells 102 that are arranged in an electrical series configuration. Further, photovoltaic array 201 may include photovoltaic cells 102 arranged in a parallel electrical scheme. DC power supply 201 may optionally include one or more blocking diodes 212 that permit electrical current flow from DC power supply 201 to DC bus 203, but restrict or prevent electrical current flow from DC bus 203 into DC power supply 201. DC power supply 201 does not include a DC/DC converter and DC power supply 201 is not electrically coupled to DC bus 203 via a DC/DC converter.

Electric power conversion system 200 also includes a sole DC/DC converter 202 that is bi-directional such that it may transfer electrical power from DC bus 203 to electric energy storage device 205, or alternatively, sole DC/DC converter 202 may transfer electric energy from electric energy storage device 205 to DC bus 203. Sole DC/DC converter 202 may be of the type described in FIG. 3 or of an alternative configuration that provides similar functionality. Thus, it should be appreciated that the particular configuration of DC/DC converter 202 is not limited. Sole DC/DC converter 202 is directly electrically coupled to DC bus 203.

Inverter 112 is shown directly electrically coupled to DC bus 203. Inverter 112 may be a single, two, or three phase inverter that converts DC electrical energy into AC electrical power. Inverter 112 does not include a DC/DC converter and inverter 112 is not electrically coupled to DC bus 203 via a DC/DC converter. Inverter 112 is electrically coupled to stationary AC electric power grid 114.

The maximum voltage of DC bus 203 may be within ±10 percent of the open circuit voltage of photovoltaic array 201. Further, voltage of DC bus 203 may be controlled via a controller included within DC/DC converter 202. In one example, voltage of DC buss 203 is controlled to a voltage that may provide 300-1000 VDC when switched to match inverter 112 input without being boosted (e.g., increased). Output voltage of electric energy storage device 205 may be less than, greater than, or equal to voltage of DC bus 203. In examples where output voltage of electric energy storage device 205 is less than voltage of DC bus 203, sole DC/DC converter may be operated in a boost mode to transfer electric power from electric energy storage device 205 to DC bus 203. DC/DC converter may operate to increase or decrease electrical load impedance provided via DC bus 203 to photovoltaic array 201 to increase the efficiency of photovoltaic array 201. By adjusting switching of MOS-FETs (e.g., 210-213, 240, and 241) or other transistors included in DC/DC converter, the effective impedance presented by DC bus 203 to photovoltaic array 201 may be adjusted. For example, if an electrical load (e.g., power=I (current)*V(voltage)) provided to DC bus 203 via AC grid is constant, an amount of charge stored in electric energy storage device 205 is low, and power being drawn from photovoltaic array 201 is less than peak power available from photovoltaic array 201, then switching of DC/DC converter 202 (e.g., varying a duty cycle of a control signal supplied to transistors 210-213, 240, and 241) may be adjusted to decrease an effective impedance of DC bus 203, thereby increasing current flow to electric energy storage device 205. The switching of DC/DC converter 202 may be adjusted to increase current flow to electric energy storage device 205 until increasing current flow to electric energy storage device 205 decreases output power of photovoltaic array 201. Thus, as will be explained in further detail, switching of sole DC/DC converter 202 may be adjusted such that the photovoltaic array 201 operates at its maximum power point.

Inverter 112 switches voltage provided directly by DC bus 203 to provide AC power that is delivered to AC stationary power grid 114. Switching of inverter 112 may be responsive to stationary AC electric power grid operating conditions, operating conditions of photovoltaic array 201 (e.g., output current and voltage of photovoltaic array 201), and operating conditions of electric energy storage device (e.g., state of battery charge).

Referring now to FIG. 3, a detailed schematic that includes internal components of sole DC/DC converter 202 is shown. Components of FIG. 3 having the same numeric labels as components in FIGS. 1 and 2 are the same components described in FIGS. 1 and 2. Further, components having the same numeric labels as components in FIGS. 1 and 2 operate the same as the components in FIGS. 1 and 2. Therefore, for the sake of brevity the description of those components is not repeated.

Sole DC/DC converter 202 includes a first transformer 205 that includes a primary coil 206 and a secondary coil 207. Current flowing into or out of DC/DC converter 202 may be sensed via first transformer 205 and the sensed current value may be provided to controller 260. First transformer 205 is electrically coupled to DC bus 203 and a full bridge comprising metal oxide semiconductor field effect transistors (MOSFETs) 210-213, although other types of transistors may be applied to produce the full bridge. The drain of MOSFETs shown in FIG. 3 is indicated by the letter D near the individual MOSFETs. The source of MOSFETs in FIG. 3 is indicated by the letter S near the individual MOSFETs. The gate of MOSFETs shown in FIG. 3 is indicated by the letter G near the individual MOSFETs. The left leg 215 of the full bridge is electrically coupled to the left side of inductor 220. The right leg 216 of the full bridge is electrically coupled to primary coil 225a of isolation transformer 225. The right side of inductor 220 is electrically coupled to the left side of capacitor 217 and the right side of capacitor 217 is electrically coupled to an opposite side of primary coil 225a than the side of primary coil 225a that is electrically coupled to right leg 216 of the full bridge. Drains of MOSFETs 210 and 212 are electrically coupled to first transformer 205. Sources of MOSFETs 211 and 213 are electrically coupled to ground potential 298. Gates of MOSFETs 210-213 are electrically coupled to driver circuitry 262, which are operated via input/output section 280 of controller 260. MOSFETs 210-213 may be activated (e.g., switched on) to allow current flow through the respective MOSFETs. MOSFETs 210-213 may be deactivated (e.g., switched off) to prevent current flow through the respective MOSFETs.

Isolation transformer 225 includes a first secondary coil 225b and a second secondary coil 225c with center tap 225d. First secondary coil 225b is electrically coupled to second secondary coil 225c at center tap 225d. In addition, left side of inductor 230 is electrically coupled to center tap 225d. First secondary coil 225b is also electrically coupled to the drain of MOSFET 240. Second secondary coil 225c is electrically coupled to the drain of MOSFET 241. MOSFETs 240 and 241 may rectify output of first and second secondary coils 225b and 225c to DC. The gates of MOSFETs 240 and 241 are electrically coupled to rectifier drive circuitry 261, which is operated via input/output section 280 of controller 260. Input/output section 280 may include digital inputs/outputs, analog inputs/outputs, and communications ports. The sources of MOSFETs 240 and 241 are electrically coupled to ground potential 299. Ground potential 298 is different than ground potential 299. The right side of inductor 230 is electrically coupled to filter capacitor 232 and electric energy storage device 205. Low voltage load current may be sensed via current sensor 263 and input to controller 260.

Controller 260 includes input/output section 280 along with a central processing unit 281, read-only (non-transitory) memory 282, and random access (transitory) memory 283. Controller 260 may sense voltage output of photovoltaic array 201 and current output of photovoltaic array 201 via current sensor 235. Controller 260 may communicate with optional remote controller 265 via controller area network (CAN) 275 or other known type of communications link. Remote controller 265 also includes a central processing unit 266, read-only (non-transitory) memory 267, and random access (transitory) memory 268. Remote controller 265 may communicate stationary AC grid operating conditions to controller 260. Further, controller 265 may convey and receive status information (e.g., conditions of degradation, requests for power, requests to suspend delivery of power, etc.) from controller 260.

DC/DC converter 202 may operate in a buck mode via changing a direction of current flow through inductor 220 and primary winding 225a via switching on and off MOSFETs 210-213. In the buck mode of operation, electric power may be transferred from DC bus 203 to electric energy storage device 205. Controller 260 selectively activates MOSFETs 210-213 and selectively deactivates MOSFETs 210-213 to change the direction of current flow through inductor 220 and primary winding 225a. MOSFETs 240 and 241 may be selectively activated and deactivated to rectify output of secondary coil 225b. Electric power from DC bus 203 at a higher DC voltage (e.g., 300-1000 VDC) is converted to electric power provided to low voltage DC bus 238 at a lower voltage (e.g., 20-100 VDC) than DC bus 203.

DC/DC converter 202 may also operate in a boost mode via selectively charging and discharging inductor 230 via activating and deactivating MOSFETs 240 and 241. In particular, MOSFETs 240 and 241 may be activated (e.g., allowing current flow through the MOSFET) simultaneously or contemporaneously to charge inductor 230, then MOSFETs 240 and 241 may be deactivated (e.g., ceasing current flow through the MOSFET) at different times to discharge inductor 230 and transfer power provided by electric energy storage device 205 to primary coil 225a. MOSFETs 210-213 may then be switched (e.g., activated and deactivated) to rectify output of primary coil 225a and inductor 220. The rapid change in the direction of current flow through injector 230 increases voltage applied to coil 225b and the output voltage of primary coil 225a and inductor 220. As such, battery voltage (e.g., 48 volts) is increased to a higher voltage (e.g., DC bus voltage or slightly greater) so that electrical power may be transferred from electric energy storage device 205 to DC bus 203. Further, an electrical impedance that DC/DC converter presents to DC bus 203 may be increased or decreased via adjusting duty cycles of signals applied to transistors 210-213, 240, and 241. Electric power supplied to DC bus 203 may be transferred to stationary AC electric power grid 114.

In this way, electric power may be transferred from DC bus 203 to electric energy storage device 205 via operating DC/DC converter in a buck mode. Further, electric power may be transferred from electric energy storage device 205 to DC bus 203 for distribution to stationary AC electric power grid 114 via operating DC/DC converter in a boost mode. DC/DC converter 202 may adjust a voltage level of a DC power source 201 that is provided to a DC output consumer (e.g., DC bus 203 or electric energy storage device 205) to increase efficiency of DC power source 201. Note that the efficiency of DC power source 201 may be a function of output voltage and output current of DC power source 201.

Referring now to FIGS. 4A-4D, example operating modes and electrical power flow for the operating modes for the electric power conversion system of FIG. 2 are shown. Components of FIGS. 4A-4D having the same numeric labels as components in FIGS. 1 and 2 are the same components described in FIGS. 1 and 2. Further, components of FIGS. 4A-4D having the same numeric labels as components in FIGS. 1 and 2 operate the same as the components in FIGS. 1 and 2. Therefore, for the sake of brevity the description of those components is not repeated.

FIG. 4A is a first operating mode where sole DC/DC converter 202 is operating in a boost mode to transfer electric power from electric energy storage device 205 to DC bus 203 in the direction indicated by arrow 403. Further, photovoltaic array 201 supplies electrical power to DC bus 203 in the direction indicated by arrow 401. Inverter 112 transfers electric power from DC bus 203 to stationary AC electric power grid 114 in the direction indicated by arrow 402. Thus, electric energy storage device 205 and photovoltaic array 201 supply electric power to stationary AC electric power grid 114 via inverter 112.

Electric power conversion system 200 may transfer electric power as shown in FIG. 4A when stationary AC electric power grid is requesting or will accept an amount of electric power that is greater than the amount of electric power that may be produced solely by photovoltaic array 201. Further, electric power conversion system 200 may transfer electric power as shown in FIG. 4A when a state of charge of electric energy storage device 205 is greater than a threshold state of charge.

FIG. 4B shows a second operating mode where sole DC/DC converter 202 is operating in a boost mode to transfer electric power from electric energy storage device 205 to DC bus 203 in the direction indicated by arrow 407. Photovoltaic array 201 is not supplying electrical power to DC bus 203, and inverter 112 transfers electric power from DC bus 203 to stationary AC electric power grid 114 in the direction indicated by arrow 430. Thus, electric energy storage device 205 solely supplies electric power to stationary AC electric power grid 114 via inverter 112.

Electric power conversion system 200 may transfer electric power as shown in FIG. 4B when stationary AC electric power grid is requesting or will accept electric power and photovoltaic array 201 is not outputting electric power (e.g., at night time). Electric power conversion system 200 may transfer electric power as shown in FIG. 4B when a state of charge of electric energy storage device 205 is greater than a threshold state of charge.

Figure 4C:
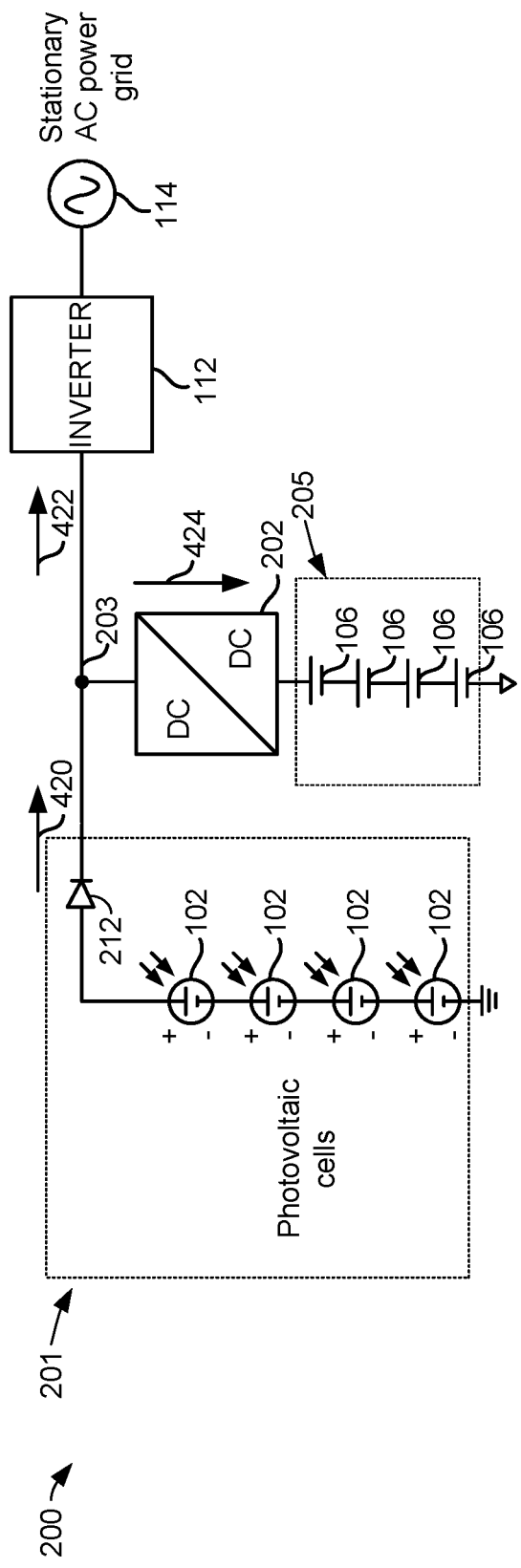

FIG. 4C is a third mode where sole DC/DC converter 202 is operating in a buck mode to transfer electric power from DC bus 203 to electric energy storage device 205 in the direction indicated by arrow 424. Further, photovoltaic array 201 supplies electrical power to DC bus 203 in the direction indicated by arrow 420. Inverter 112 transfers electric power from DC bus 203 to stationary AC electric power grid 114 in the direction indicated by arrow 422. Thus, photovoltaic array 201 supplies electric power to stationary AC electric power grid 114 via inverter 112 and electric energy storage device 205 via sole DC/DC converter 202.

Electric power conversion system 200 may transfer electric power as shown in FIG. 4C when stationary AC electric power grid is requesting or will accept a small amount of electric power, state of charge of electric energy conversion device 201 is low, and when electric power output of photovoltaic array 201 is greater than the amount of electric power stationary AC electric power grid 114 may request or accept.

Figure 4D:
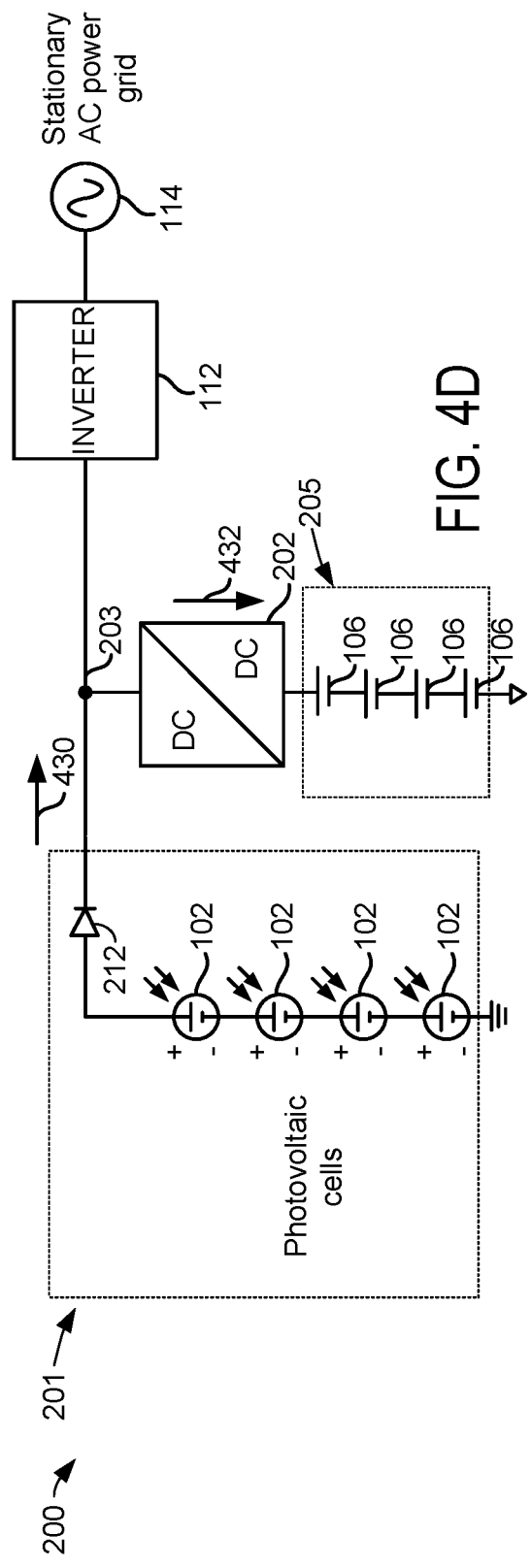

FIG. 4D is a fourth mode where sole DC/DC converter 202 is operating in a buck mode to transfer electric power from DC bus 203 to electric energy storage device 205. Electric power is not being supplied to stationary AC electric power grid 114 and photovoltaic array 201 is supplying electric power to DC bus 203. Inverter 112 may be deactivated in this mode so that internal switching of transistors does not take place within inverter 112.

Electric power conversion system 200 may transfer electric power as shown in FIG. 4D when stationary AC electric power grid is not requesting or receiving electric power and when a state of charge of electric energy storage device 205 is low. Further, to operate in this mode, photovoltaic array 201 may have capacity to supply electrical power to DC bus 203.

The system of FIGS. 2-4D may provide for an electric power conversion system, comprising: a direct current (DC) bus; a DC power source directly electrically coupled to the DC bus; an inverter directly coupled to the DC bus; an electric energy storage device; and a sole DC/DC converter electrically coupled to the DC bus and the electric energy storage device. The electric power conversion system includes where the DC power source is a photovoltaic array, and where the electric energy storage device is a battery. The electric power conversion system further comprises an alternating current (AC) power grid, and where the inverter is electrically coupled to the AC power grid. The electric power conversion system includes where the DC/DC converter is bi-directional. The electric power conversion system includes where the DC/DC converter includes a controller. The electric power conversion system further comprises executable instructions stored in non-transitory memory of the controller to operate the DC/DC converter in a buck mode to transfer electric power from the DC bus to the electric energy storage device. The electric power conversion system includes where the DC/DC converter is operated in the buck mode in response to an electrical load the DC bus provides to the DC power source. The electric power conversion system includes where the electrical load is less than an electrical load that causes the DC power source to operate substantially at a maximum power tracking point. The electric power conversion system further comprises executable instructions stored in non-transitory memory of the controller to operate the DC/DC converter in a boost mode to transfer electric power from the battery to the DC bus. The electric power conversion system includes where the DC/DC converter is operated in a boost mode in response to an electrical load the DC bus provides to the DC power source. The electric power conversion system includes where the electrical load is greater than an electrical load that causes the DC power source to operate substantially at a maximum power tracking point.

The system of FIGS. 2-4D also provides for an electric power conversion system, comprising: a direct current (DC) bus; a DC power source directly electrically coupled to the DC bus; an inverter directly coupled to the DC bus; a battery; a sole DC/DC converter electrically coupled to the DC bus and the battery; and a controller, the controller electrically coupled to the DC power source and the battery, the controller including executable instructions stored in non-transitory memory to operate the sole DC/DC converter in a buck mode in response to a first operating condition of the DC power source, and to operate the DC/DC converter in a boost mode in response to a second operating condition of the DC power source. The electric power conversion system includes where the first condition is an electrical load applied to the DC power source being less than an electrical load that provides a maximum power output for present DC power source operating conditions, and where the second condition is an electrical load applied to the DC power source being greater than an electrical load that provides a maximum power output for present DC power source operating conditions. The electric power conversion system further comprises additional instructions to adjust a load provided via the sole DC/DC converter to the DC bus responsive to output voltage and current of the DC power source. The electric power conversion system further comprises additional instructions to operate the sole DC/DC converter in a boost mode in response to a request to provide electric power to the AC grid. The electric power conversion system further comprises additional instructions to operate the sole DC/DC converter in a buck mode in response to a state of charge of the battery and output current and voltage of the DC power source. Solid lines (e.g., 203) shown between electrical devices represent conductors electrically coupling the electrical devices in FIGS. 1-4D.

Referring now to FIG. 5, a method for operating the electric power conversion system 200 is shown. The method of FIG. 5 may be included as executable instructions stored in non-transitory memory of the system of FIGS. 2-4D. In addition, the methods of FIG. 5 may work in cooperation with the system of FIGS. 2-4D to receive data and adjust actuators to control the system of FIGS. 2-4D in the physical or real world.

At 502, method 500 determines a stationary AC electric power grid power request amount. The stationary AC electric power grid may broadcast permission to transfer power to the AC power grid via a remote controller. Further, the AC power grid may issue a request to provide electric power to the AC power grid via broadcasting a request from a remote controller and received via a CAN or other known communication link. Alternatively, method 500 may assume that the stationary AC electric power grid may accept electrical output up to the total electric output capacity of electric power conversion system 200, and the total maximum output capacity of the electric power conversion system may be stored in controller memory. Method 500 proceeds to 504.

At 504, method 500 estimates the electric power output capacity of the photovoltaic array (PV) 201. In one example, method 500 may estimate the electric power output capacity of the photovoltaic array in response to voltage output by the photovoltaic array, time of day, local sun light conditions, characteristics of the photovoltaic array (e.g., total number of photovoltaic cells in the array, series and parallel connections of photovoltaic cells, etc.), and other operating conditions of the photovoltaic array. Method 500 may estimate electric output capacity of the photovoltaic array 201 via one or more functions and/or tables that are referenced via operating conditions of the photovoltaic array. The functions and/or tables may include empirically determined values for estimating electric output of the photovoltaic array 201. Method 500 proceeds to 506.

At 506, method 500 judges if electric power requested via the stationary AC electric power grid 114 is greater than electrical output power capacity of the photovoltaic array 210. If method 500 judges that electric power requested by the stationary AC electric power grid 114 is greater than electric power output capacity of the photovoltaic array 201, the answer is yes and method 500 proceeds to 508. Otherwise, the answer is no and method 500 proceeds to 520.

At 508, method 500 judges if a state of charge (SOC) of an electric energy storage device 205 is greater than a second threshold state of charge. Method 500 may estimate SOC of the electric energy storage device via a voltage of the electric energy storage device 205 and coulomb counting or via other known methods. If the electric energy storage device is an iron flow battery, method 500 may draw charge from the iron flow battery until the iron flow battery voltage is at zero volts or ground potential. If method 500 judges that the state of charge (SOC) of the electric energy storage device 205 is greater than the second threshold state of charge, the answer is yes and method 500 proceeds to 510. Otherwise, the answer is no and method 500 proceeds to 514.

In addition, in some examples, method 500 may proceed to 510 to operate DC/DC converter 202 in a boost mode if inverter 112 is providing a low impedance level at DC bus 203 applied to photovoltaic array 201 that reduces voltage output of photovoltaic array 201 such that photovoltaic array is not operating at a maximum power point of photovoltaic array (e.g., a voltage and current that maximizes power output of photovoltaic array 201).

At 510, method 500 operates the sole DC/DC converter in a boost mode to transfer electric power from the electric energy storage device to the DC bus of the DC/DC converter. Electric power is also supplied to the DC bus via the photovoltaic array if the photovoltaic array is has sufficient electrical energy output capacity. The switching of the DC/DC converter may be adjusted to operate the photovoltaic array at a maximum power point (e.g., a voltage and current output from the photovoltaic array that provides a maximum or higher electric power output than other voltage and current outputs of the photovoltaic array). In one example, if the switching of the DC/DC converter is adjusted to increase power supplied to the DC bus from the electric energy storage device and the power output from the photovoltaic array increases due to a change in effective impedance presented by the DC bus to the photovoltaic array resulting from adjusting switching of the DC/DC converter, then switching of the DC/DC converter may be further adjusted to attempt to further increase the electric power output from the photovoltaic array.

The maximum power output from the photovoltaic array may be a function of the voltage and current output from the photovoltaic array. Consequently, by adjusting effective impedance (e.g., electrical load) presented to the photovoltaic array by the DC bus and devices electrically coupled to the DC bus (e.g., the DC/DC converter and the inverter) in response to photovoltaic array output current and voltage, electrical output of the photovoltaic array may be maximized. Thus, if electric output power of the photovoltaic array increases in response to increasing a duty cycle duration that operates switches (e.g., MOSFETs 240 and 241) that control the DC/DC converter output in boost mode, then the duty cycle may be increased until electric output power of the photovoltaic array begins to decrease to maximize efficiency of the photovoltaic array 201. Conversely, if electric output power of the photovoltaic array increases in response to decreasing a duty cycle duration that operates switches that control the DC/DC converter output in boost mode, then the duty cycle may be decreased until electric output power of the photovoltaic array begins to decrease to maximize efficiency of the photovoltaic array 201. Method 500 proceeds to 512.

At 512, method 500 supplies AC electric power to the stationary AC electric grid 114 via the inverter 112 by converting DC electric power from the DC bus 203 into AC power. And, since the photovoltaic array 201 and the electric energy storage device 205 are supplying electric power to the DC bus 203, the photovoltaic array 201 and the electric energy storage device 205 are providing electric power to the stationary AC electric power grid 114. Method 500 proceeds to exit.

At 514, method 500 deactivates the DC/DC converter 202 via ceasing switching of MOSFETS 210-213, 240, and 241 to conserve power. Further, photovoltaic array 201 provides electrical power to DC bus 203, and DC power from DC bus 203 is converted into AC power via inverter 112 and delivered to stationary AC electric power grid 114. In this way, the photovoltaic array provides power to the stationary AC electric power grid without passing through a DC/DC converter. Method 500 proceeds to exit.

At 520, method 500 judges if a state of charge (SOC) of an electric energy storage device 205 is less than a first threshold state of charge. If method 500 judges that the state of charge (SOC) of the electric energy storage device 205 is less than the first threshold state of charge, the answer is yes and method 500 proceeds to 522. Otherwise, the answer is no and method 500 proceeds to 530.

In addition, in some examples, method 500 may proceed to 522 to operate DC/DC converter 202 in a buck mode if inverter 112 is providing a high impedance (e.g., electrical load) level at DC bus 203 applied to photovoltaic array 201 that reduces current output of photovoltaic array 201 such that photovoltaic array is not operating at a maximum power point of photovoltaic array (e.g., a voltage and current that maximizes power output of photovoltaic array 201). Thus, the DC/DC converter 202 may be operated in a buck mode in response to output current and voltage of the photovoltaic array 201. By operating the DC/DC converter in a buck mode, current drawn from the photovoltaic array 201 may be increased to increase efficiency of the photovoltaic array 201.

At 522, method 500 operates the sole DC/DC converter 202 in a buck mode to transfer electric power from the DC bus 203 of the DC/DC converter 202 to the electric energy storage device 205. Electric power is supplied to the DC bus 203 via the photovoltaic array 201. The switching of the DC/DC converter (e.g., activation and deactivation of MOSFETS or other transistors in the DC/DC converter to transmit electrical power) may be adjusted to operate the photovoltaic array at a maximum power point (e.g., a voltage and current output from the photovoltaic array that provides a maximum or higher electric power output than other voltage and current outputs of the photovoltaic array). In one example, if the switching of the DC/DC converter is adjusted to increase power received from the DC bus, which is supplied via the photovoltaic array, and the power output from the photovoltaic array increases due to a change in effective impedance presented by the DC bus to the photovoltaic array resulting from adjusting switching of the DC/DC converter, then switching of the DC/DC converter may be further adjusted to attempt to further increase the electric power output from the photovoltaic array.

Thus, if electric output power of the photovoltaic array increases in response to increasing a duty cycle duration that operates switches (e.g., MOSFETs 210-213) that control the DC/DC converter output in buck mode, then the duty cycle of the signal that operates the switches may be increased until electric output power of the photovoltaic array begins to decrease. Conversely, if electric output power of the photovoltaic array increases in response to decreasing a duty cycle duration that operates switches that control the DC/DC converter output in buck mode, then the duty cycle of the signal that operates the switches may be decreased until electric output power of the photovoltaic array begins to decrease. Method 500 proceeds to 524.

At 524, method 500 supplies AC electric power to the stationary AC electric grid via the inverter 112 by converting DC electric power from the DC bus 203 into AC power. Further, the photovoltaic array provides electric power to the electric energy storage device since it has capacity to supply the stationary AC grid and since electric energy storage device SOC is low. If the electric energy storage device is an iron flow battery, the iron flow battery may be charged from a level of zero volts or ground potential so output voltage of the DC/DC converter may be controlled to a low voltage (e.g., less than 0.5 volts, or less than 1 volt, or less than 2 volts) when initially charging the iron flow battery so that current flow may be reduced. Method 500 proceeds to exit.

At 530, method 500 deactivates the DC/DC converter via ceasing switching of MOSFETS 210-213, 240, and 241 to conserve power. Further, photovoltaic array 201 provides electrical power to DC bus 203, and DC power from DC bus 203 is converted into AC power via inverter 112 and delivered to stationary AC electric power grid 114, if requested. In this way, the photovoltaic array provides power to the stationary AC electric power grid without passing through a DC/DC converter. Method 500 proceeds to exit.

The method of FIG. 5 provides for a method of electric power conversion, comprising: operating a sole DC/DC converter of a power distribution system in a buck mode in response to operating conditions of a photovoltaic array, operating the sole DC/DC converter of the power distribution system in a boost mode in response to operating conditions of the photovoltaic array, the DC/DC converter directly electrically coupled to a DC bus, the photovoltaic array directly coupled to the DC bus, the DC bus directly electrically coupled to an inverter. The method further comprises operating the DC/DC converter in the buck mode or the boost mode in further response to output efficiency of the photovoltaic array. The method further comprises transferring electrical charge from the photovoltaic array to a battery via the sole DC/DC converter, the battery electrically isolated from the photovoltaic array via a transformer that includes a primary coil and a secondary coil. The method further comprising operating the DC/DC converter in the buck mode in response to a state of battery charge.

Referring now to FIG. 6, an example embodiment of an all iron redox flow battery (IFB) is shown. The IFB is an electric energy storage device that may be included in the system of FIG. 2 as element 205. The IFB may include plating electrolyte that is stored in plating electrolyte tank 600. The IFB may also include redox electrolyte that is stored in redox electrolyte tank 601. The plating electrolyte and redox electrolyte may be a suitable salt dissolved in water, such as $FeCl_2$ or $FeCl_3$. Both the plating electrolyte and redox electrolyte may use the same salt at different molar concentrations, a feature of the IFB not available in batteries with different reactive compounds. Both tanks may be in fluidic communication with the positive reactor 624 and negative reactor 622 of the IFB. Separating the negative and positive reactors and their respective electrolytes is barrier 620. The barrier may embodied as a membrane barrier, such as an ion exchange membrane or a microporous membrane, placed between the plating electrolyte and redox electrolyte to prevent electrolyte cross-over and provide ionic conductivity. Sensors 602 and 604 may be used to determine the chemical properties of the electrolyte, including pH and may be embodied as an optical sensor. Probes 626 and 628 may additionally or alternatively be used to determine the chemical properties (discussed below) of the electrolytes. Other embodiments may have a plating electrolyte probe, plating electrolyte sensor, redox electrolyte probe, redox electrolyte sensor, or some combination thereof. The probe may also be placed inside the reacting portion of the IFB in negative reactor 622 and positive reactor 624. The acid additive may be in additional tank 606 and 608. These may contain different additives and be controlled by different routines. In other embodiments, the IFB may also have either a positive side additive or a negative side additive and not both. The positive side additive may be accelerated into the positive reactor 622 by positive additive pump 612, the negative additive may be accelerated into the negative reactor 624 by negative additive pump 610. Alternately, the electrolyte additives may be pumped into tanks 600 and 601. Pumps 610 and 612 may be actuated via a control system communicatively coupled to the pumps. The control system may be responsive to probe 626, probe 628, sensor 602, sensor 604, or any combination thereof. The electrolytes may be pumped from the reactor by pumps 630. The IFB includes a negative electrode 614 and a positive electrode 616.

Note that the example control and estimation routines included herein can be used with various power conversion system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various described hardware components in combination with one or more controllers.

This concludes the description. The reading of it by those skilled in the art would bring to mind many alterations and modifications without departing from the spirit and the scope of the description. For example, different DC/DC converters may be applied to use the present description to advantage.

The invention claimed is:

1. An electric power conversion system, comprising:
   a direct current (DC) bus;
   a DC power source directly electrically coupled to the DC bus;
   an inverter directly coupled to the DC bus and electrically connectable to a stationary alternating current (AC) electric power grid, the inverter adapted to convert DC electric energy on the DC bus to AC electric energy for the stationary AC electric power grid;
   an all iron redox flow battery, the all iron redox flow battery having a plating electrolyte and a redox electrolyte, the all iron redox flow battery adapted to permit the plating electrolyte and the redox electrolyte to comprise different molar concentrations of a predetermined salt; and
   a sole DC/DC converter electrically coupled to the DC bus and the all iron redox flow battery, wherein a controller senses a voltage output and/or a current output of the DC power source via a DC power source sensor, and wherein the sole DC/DC converter includes transistors configured to switch in response to a signal transmitted by the controller to adjust a direction of current flow and/or adjust an effective impedance of the DC bus.

2. The electric power conversion system of claim 1, wherein the DC power source is a photovoltaic array, and wherein the DC power source includes one or more blocking diodes adapted to permit electrical current flow from the DC power source to the DC bus and restrict or prevent electrical current flow from the DC bus to the DC power source.

3. The electric power conversion system of claim 2, further comprising an AC power grid, and wherein the inverter is electrically coupled to the AC power grid.

4. The electric power conversion system of claim 3, wherein the DC/DC converter is bi-directional.

5. The electric power conversion system of claim 4, wherein the DC/DC converter includes the controller.

6. The electric power conversion system of claim 5, further comprising executable instructions stored in non-transitory memory of the controller to operate the DC/DC converter in a buck mode to transfer electric power from the DC bus to the all iron redox flow battery.

7. The electric power conversion system of claim 6, wherein the DC/DC converter is operated in the buck mode in response to an electrical load the DC bus provides to the DC power source.

8. The electric power conversion system of claim 7, wherein the electrical load is less than an electrical load that causes the DC power source to operate substantially at a maximum power tracking point.

9. The electric power conversion system of claim 5, further comprising executable instructions stored in non-transitory memory of the controller to operate the DC/DC converter in a boost mode to transfer electric power from a battery to the DC bus.

10. The electric power conversion system of claim 9, wherein the DC/DC converter is operated in the boost mode in response to an electrical load the DC bus provides to the DC power source.

11. The electric power conversion system of claim 10, wherein the electrical load is greater than an electrical load that causes the DC power source to operate substantially at a maximum power tracking point.

12. An electric power conversion system, comprising:
    a direct current (DC) bus;
    a DC power source directly electrically coupled to the DC bus;
    an inverter directly coupled to the DC bus and electrically connectable to a stationary alternating current (AC) electric power grid, the inverter adapted to convert DC electric energy on the DC bus to AC electric energy for the stationary AC electric power grid;
    a battery, the battery comprising an all iron redox flow battery having a plating electrolyte and a redox electrolyte, the all iron redox flow battery adapted to permit the plating electrolyte and the redox electrolyte to comprise different molar concentrations of a predetermined salt;

a sole DC/DC converter electrically coupled to the DC bus and the battery and including switchable transistors; and a controller, the controller electrically coupled to the DC power source and the battery, the controller including executable instructions stored in non-transitory memory to:

switch the transistors to adjust a direction of current flow and/or adjust an effective impedance of the DC bus; and operate the sole DC/DC converter in a buck mode in response to a first operating condition of the DC power source, and to operate the DC/DC converter in a boost mode in response to a second operating condition of the DC power source.

13. The electric power conversion system of claim 12, wherein the first condition is an electrical load applied to the DC power source being less than an electrical load that provides a maximum power output for present DC power source operating conditions, and wherein the second condition is an electrical load applied to the DC power source being greater than an electrical load that provides a maximum power output for present DC power source operating conditions.

14. The electric power conversion system of claim 12, further comprising:

additional instructions to adjust an electrical load provided via the sole DC/DC converter to the DC bus responsive to output voltage and current of the DC power source.

15. The electric power conversion system of claim 12, further comprising additional instructions to operate the sole DC/DC converter in the boost mode in response to a request to provide electric power to an AC grid.

16. The electric power conversion system of claim 15, further comprising additional instructions to operate the sole DC/DC converter in the buck mode in response to a state of charge of the battery and output current and voltage of the DC power source.

17. A method of electric power conversion, comprising:

operating a sole direct current (DC)/DC converter of a power distribution system for an all iron redox flow battery in a buck mode in response to operating conditions of a photovoltaic array, operating the sole DC/DC converter of the power distribution system in a boost mode in response to operating conditions of the photovoltaic array, the sole DC/DC converter directly electrically coupled to a DC bus, the photovoltaic array directly coupled to the DC bus, the DC bus directly electrically coupled to an inverter; and switching transistors of the sole DC/DC converter to adjust an electrical impedance provided by the DC bus to maximize an electrical output of the photovoltaic array;

wherein the all iron redox flow battery includes a plating electrolyte and a redox electrolyte, the all iron redox flow battery adapted to permit the plating electrolyte and the redox electrolyte to comprise different molar concentrations of a predetermined salt.

18. The method of claim 17, further comprising:

operating the DC/DC converter in the buck mode or the boost mode in further response to output efficiency of the photovoltaic array; and operating the DC/DC converter in the buck mode or the boost mode in response to an operating state of the all iron redox flow battery.

19. The method of claim 17, further comprising transferring electrical charge from the photovoltaic array to the all iron redox flow battery via the sole DC/DC converter, the all iron redox flow battery electrically isolated from the photovoltaic array via a transformer that includes a primary coil and a secondary coil.

20. The method of claim 17, further comprising operating the sole DC/DC converter in the buck mode in response to a state of battery charge.

* * * * *